June 8, 1926.

W. H. KEMPER 1,588,113

ACCELERATOR FOR MOTOR CARS

Filed Dec. 31, 1925

Inventor:
William H. Kemper,
by [signature]
Atty.

Patented June 8, 1926.

1,588,113

UNITED STATES PATENT OFFICE.

WILLIAM H. KEMPER, OF MONTGOMERY, ALABAMA.

ACCELERATOR FOR MOTOR CARS.

Application filed December 31, 1925. Serial No. 78,535.

My invention relates to accelerators to be used with the well known Ford type of cars, wherein low-speed and reverse are controlled by foot-pedals, and the object of my invention is to provide novel, simple, efficient and inexpensive apparatus whereby the throttle can be opened by operation of either low-speed or reverse pedal and also by an accelerator pedal or push rod of ordinary type.

Figure 1:
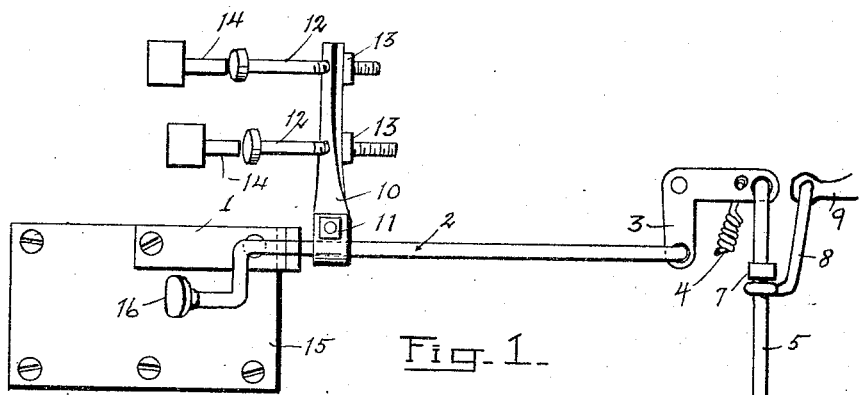
Figure 2:
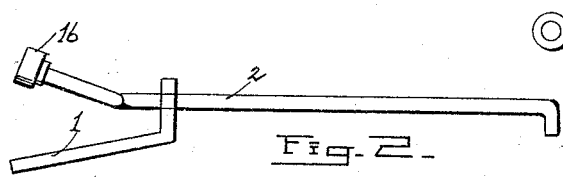

In the drawing Fig. 1 shows the elements which compose my invention, in a plan view, only so much of the Ford car being shown as necessary to understand how and where the apparatus is placed, while Fig. 2 is a side view of the push rod and accelerator pedal and its guide.

In carrying out my invention I provide a push rod capable of backward and forward movement and suitably guided therefor, place a pedal or foot button on the rear end of such rod, and attach a branch to such rod, from which branch I provide adjustable push rods adapted, each independently, to be engaged by the slow-speed pedal arm and the reverse pedal arm, and thus to move the push rod as well as could the pedal on the rear end.

In Fig. 1, the plan view, 1 is an arm shaped to fit on one edge of the usual six-holed plate, 15, which closes the transmission box on a Ford car, being held by two of the usual six screws, or by suitable bolts in the same places. Fig. 2 shows a side view of the guide 1. I provide a rod 2, supported by a hole through guide 1, and connected to a bell-crank lever 3, normally restrained by a spring 4, and from which bell-crank lever is extended a rod 5 to the throttle or carbureter lever 6.

A collar 7, on rod 5, serves to engage a link 8, connected to the usual steering column throttle control lever 9, merely shown to illustrate that the invention is in addition to the usual hand control. Forward of the guide 1 I secure a flat bar 10, bent around rod 2 and secured by bolt as at 11, and I partly twist bar 10, bore two or more holes, which are threaded, and in which are rods, as 12, 12, adapted to be engaged by the low-speed and reverse pedals, 14, 14. These rods 12, 12, are secured by being screwed into the member 10 and also have lock nuts as at 13, 13, by means of which they can be adjusted to suit different positions of the pedals, these positions, as everyone familiar with Ford cars knows, depending upon the degree of adjustment of the brake bands controlled by the pedals. Fig. 2 is shown merely to illustrate the shape given to rod 2, it being bent to the right and then rearward and to an extent upward. The upper part is intended, as will be understood, to pass through suitable opening in floor boards.

It will be evident that the push rod can be actuated by pressure on pedal 16, and also, with equal advantage, by forward movement of either of the pedals, 14, 14. The usual service brake pedal of a Ford, having no rod adapted to engage it, has no effect on the apparatus. This pedal is not shown in the drawing.

The parts can be varied to an extent without departing from the invention but the structure as shown is very simple, inexpensive and efficient. The round heads shown on rods 12, 12, permit adjustment by screwing these rods farther in or out, and always present ample bearing surface to be engaged by the pedal arm.

The bell crank 3 may be pivoted on a bracket or the like or otherwise supported; this presenting no difficulty to any one familiar with cars of this type.

Having described my invention, what I claim is:—

1. In apparatus of the class described, the combination with the gear shift pedals, of a rod arranged to slide backward and forward, a button on said rod adapted to be engaged by the foot of a driver, a side arm secured to said rod, and a rearwardly extended and adjustable rod held by said side arm, and adapted to be engaged by one of the pedals.

2. In apparatus of the class described, the combination with the gear shift pedals, of a rod arranged to slide backward and forward, arranged to be operated by the foot of a driver, a side arm secured to said rod, a rearwardly extended and adjustable rod held by said side arm and adapted to be engaged by one of the pedals, and an operative connection between the sliding rod and the throttle, substantially as described.

In witness whereof I have hereto set my hand this December 12, 1925.

WILLIAM H. KEMPER.